United States Patent Office 3,640,875
Patented Feb. 8, 1972

3,640,875
PROCESS FOR PREPARING A LIGHT DENSITY
BLEACH COMPOSITION
Fred K. Rubin, Bronx, N.Y., and Carl J. Carmack,
Ridgewood, N.J., assignors to Lever Brothers Company,
New York, N.Y.
No Drawing. Filed Aug. 14, 1968, Ser. No. 752,457
Int. Cl. C11d 7/56
U.S. Cl. 252—99
8 Claims

ABSTRACT OF THE DISCLOSURE

This disclosure is concerned with a light density bleach composition in which a chlorinating agent is distributed uniformly throughout a spray-dried base. This disclosure is also concerned with a process for preparing this composition.

---

In the past, high density bleach products have been prepared in which there is uniform distribution of the chlorinating agent therein. Low density bleach products have also been prepared. However, there has been a problem of securing uniform distribution of the chlorinating agent in these low density bleach products.

The aforementioned distribution is important in order to obtain uniform results when portions of the bleach composition are taken from different parts of the package. For instance, a housewife will not tolerate excessive-bleaching caused by a higher accumulation of chlorinating agents at the bottom of the package than at the top of the package.

Furthermore, it would be advantageous during the process for preparing a bleach composition to avoid severe heat treatments when the chlorinating agent is present. Otherwise, chlorinating agent decomposition is a distinct possibility which would be accompanied by fires, explosions, and pollution of the air by effluent gases.

It would also be advantageous to employ a process in which the resulting product is not a plastic mass nor a coarse granular aggregation. This eliminates breaking down and screening steps which require the installation of comminuting equipment, dust collectors and screening equipment.

It has now been discovered that a light density bleach composition can be prepared in which a chlorinating agent is distributed uniformly throughout a spray-dried base without any severe heat treatments and without any breaking down and screening operations. Thus, in accordance with one embodiment of this invention, a spray-dried base is formed and a chlorinating agent is blended with this base. An aqueous solution of tetrapotassium pyrophosphate or sodium tripolyphosphate is added to the blend to form a uniform light density bleach composition with the chlorinated agent uniformly cemented to the spray-dried base.

The three required components in the spray-dried base of this invention are a phosphate builder, a borax fluffing agent and a solubilizing agent. Suitable alkali metal phosphate builders, among others, are sodium tripolyphosphate, potassium tripolyphosphate, tetrasodium pyrophosphate, tetrapotassium pyrophosphate, sodium acid pyrophosphate, sodium trimetaphosphate, sodium tetraphosphate and sodium hexametaphosphate.

A borax fluffing agent is employed herein to promote a light density product. This includes, among others, borax pentahydrate and borax decahydrate or other inorganic compound containing water of hydration which will "pop" from the heat of spray drying to form light weight puffed beads.

Any solubilizing agent for the borax fluffing agent can be used in the present invention. Sodium toluene sulfonate and sodium xylene sulfonate, among others, are suitable.

One or more optional components can be included in the spray-dried base, such as fillers, fluorescent dyes, cerium source, colorants and surfactants. The fillers include without limitation sodium sulfate, potassium sulfate, sodium carbonate and sodium sesquicarbonate. Besides others, the following fluorescent dyes, i.e., optical brighteners, are suitable:

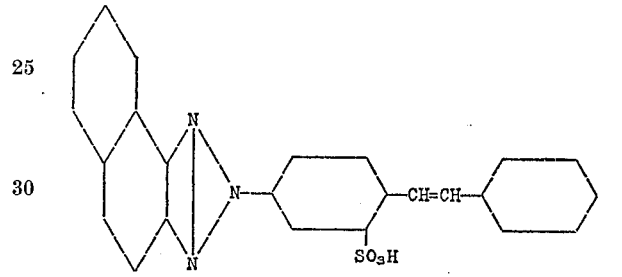

(sold under trade name Tinopal RBS),

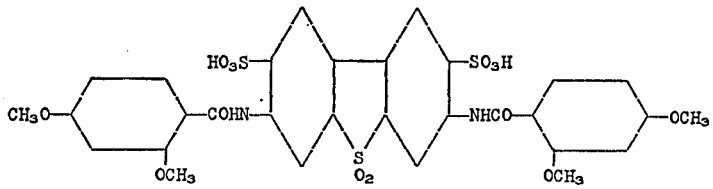

(sold under trade name Calcofluor White 5B),

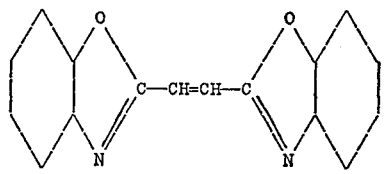

(3)

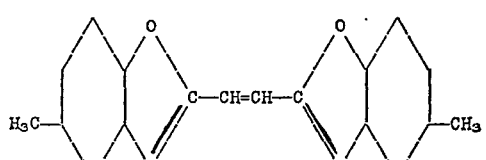

(4)

The cerium source is a fabric anti-yellowing agent and may be any known compound which provides cerium ions, e.g., cerous acetate, cerous bromate, cerous bromide, cerous chloride, cerous nitrate, cerous sulfate and mixtures of rare earth salts containing cerium compounds. The colorants, e.g., disperse organic pigments (Tinolite Padding Yellow, Color Index No. 21105, Color Index Name-Pigment Yellow 17; Dianisidine Orange, Color Index No. 21160, Color Index Name-Pigment Orange 16), vat dyes (Color Index No. 73360, Color Index Name-Vat Red 1; Color Index No. 67300, Color Index Name-Vat Yellow 2), copperphthalocyanine pigments (Color Index No. 74260, Color Index Name-Pigment Green 7) and inorganic pigments (Cobalt Blue, Color Index No. 77346, Color Index Name-Pigment Blue 28; Ultramarine Blue, Color Index No. 77007, Color Index Name-Pigment Blue 29), enhance the appearance of the product and in some instances serve as a laundry bluing agent. Any surfactant, e.g., nonionics and anionics, may be used provided that it is compatible with the chlorinating agent, such as sulfated fatty alcohols, alkyl-substituted aromatic sulfonates, alkanesulfonates, hydroxyalkanesulfonate esters of aliphatic acids having about 10 to 18 carbon atoms, sulfonated fatty oils, sulfated and sulfonated alkoxy derivatives, sulfuric acid esters of monoglycerides, ethoxylated alcohols, substituted phenols, "the pluronics" which are polyoxypropylene polymers containing varying proportions of polyoxyethylene units in the molecule and other surfactants disclosed in U.S. Pat. Nos. 3,346,504, 3,356,613, 3,346,502 and 3,326,746 which are incorporated herein by reference.

The ranges of the required and optional components in the spray-dried base are generally as follows:

| Component: | Parts by weight |
| --- | --- |
| Phosphate builder | 10–30 |
| Borax fluffing agent | 5–30 |
| Solubilizing agent | 5–35 |
| Filler | 0–20 |
| Fluorescent dye | 0–0.35 |
| Cerium source | [1] 0–0.5 |
| Colorant | 0–1.0 |
| Surfactant | 0–0.3 |
| Water | 0–15 |

[1] Based upon $Ce^{+++}$.

The aforementioned components can be spray dried by any known method. A suitable, but not the only, method used in the examples herein is to form in a crutcher an aqueous slurry, ranging in concentration form 10% to 40%, with 25% as the preferred slurry concentration, by introducing with mixing a borax fluffing agent, a solubilizing agent, a filler, a fluorescent dye, a colorant and water. This mixture is heated, e.g., to about 160° F., and the phosphate builder is added with agitation. The resulting slurry at a temperature about 160° to 180° F. is pumped to a booster or holding tank where it is circulated through a Reitz mill to improve homogeneity. From this tank the slurry is passed through a high pressure pump and is routed to single liquid spray nozzles at the top of a spray tower where it is forced out in a spray pattern at 80 to 300 p.s.i.g. pressure. The slurry droplets fall by gravity through a counter-current flow of heated air which has an inlet temperature of about 600° to 700° F. and an outlet temperature of about 200° to 300° F. to form hollow beads which is known as a spray-dried base. The moisture level, particle size and gravity of the spray-dried base can be varied by adjusting the tower air flow rate, the tower temperature, the slurry feed rate and the slurry moisture level. The final bleach composition generally has about 50% to 85% of spray-dried base.

A chlorinated agent is then blended with the spray-dried base by any acceptable procedure. For instance, the two components may be introduced into a rotating horizontal drum. As defined herein, a chlorinating agent is a stable, chlorine-releasing organic compound which is compatible with the spray-dried base and which liberates chlorine under conditions normally used for bleaching purposes. This includes the following, among others: potassium dichlorocyanurate, sodium dichlorocyanurate, [(mono - trichloro) - tetra - (mono potassium dichloro)] penta-isocyanurate, 1,3-dichloro-5,5-dimethyl hydantoin, N,N'-dichlorobenzoyleneurea, paratoluene sulfodichloroamide, trichloromelamine, N-chloroammeline, N-chloro succinimide, N,N'-dichloroazo-dicarbonamidine, N-chloro acetyl urea, N,N'-dichlorobiuret, chlorinated dicyandiamide, chlorinated trisodium phosphate, and the sodium derivative of N-chloro-p-toluene sulfonamide. Generally about 6 to 42 parts of the chlorinating agent is blended with 100 parts of the spray-dried base. The chlorinating agent usually comprises about 5% to 25% of the final bleach composition of this invention.

An aqueous solution of tetrapotassium pyrophosphate or sodium tripolyphosphate is added to the blend of spray-dried base and chlorinating agent. A satisfactory method, besides others, is to spray the tetrapotassium pyrophosphate solution or sodium tripolyphosphate solution at about room temperature at a rate of about 1 lb. per minute into the blend which is rotating in a horizontal drum whereby the chlorinating agent is cemented to the spray-dried base.

In the present invention, tetrapotassium pyrophosphate or sodium tripolyphosphate or mixtures thereof is used in the aqueous solution. If tetrapotassium pyrophosphate is employed, the concentration generally is about 50% to 65% or up to saturation with the final bleach composition containing about 1% to 13% tetrapotassium pyrophosphate solids added to the blend of spray-dried base and chlorinating agent. If sodium tripolyphosphate is employed, the concentration is generally less, e.g., about 12% to 15% or up to saturation, with the final bleach composition containing about 1% to 2% added sodium tripolyphosphate solids.

After all of the tetrapotassium pyrophosphate solution or sodium tripolyphosphate solution has been added, the product may be tempered or aged to remove surface moisture and tackiness. This tempering and aging can advantageously be performed at low temperatures, i.e., below 175° F. For instance, warm air may be blown over the product being agitated in the same drum for about 15 minutes at a temperature ranging from 100°–150° F.

The resulting light density uniform bleach composition of this invention can be used alone. However, it is possible to add other materials to the composition, such as perfumes, dedusting oils, colorants, anti-yellowing agents and moisture scavengers. Suitable perfumes include those disclosed in U.S. Pat. Nos. 3,309,276, 3,316,315, 3,326,746 and 3,363,943, with the range generally being between about 0.01% to 0.2%. Suitable dedusting oils include low viscosity mineral oils and silicone oils with the range generally being between about 0.05% to 0.2%. Additional colorants and anti-yellowing agents which have been described heretofore can be incorporated in the final bleach composition. Between about 0.5% to 1% of moisture scavengers, such as calcium silicates, colloidal silicas and silico-aluminates, can also be added to the composition. The final bleach product usually has about 5% to 15% water therein.

Thus in accordance with the process of this invention, a light density bleach composition has been formed with a uniform distribution of chlorinating agent. As defined herein, a composition is considered to be of low density if its bulk density is less than about 0.60 g./cc. As also defined herein, a composition has uniform distribution if the available chlorine values for a series of samples, taken from a single batch composition, has a co-efficient of variation of not more than 10. This is determined as follows:

$$\text{Co-efficient of variation} = \frac{\text{Standard Deviation}}{\text{Arithmetic Mean}} \times 100$$

The process of this invention also provides a product with a majority of the particles having a size ranging from about 25 to 45 mesh. Therefore, no breaking down or sizing is required. Furthermore, this product after the incorporation of the chlorinating agent can be processed at relatively low tempeatures in order to avoid possible fires, explosion and air pollution related to the release of gaseous chlorinating agent decomposition products.

The coefficient of variation for bleach compositions C, D and E was calculated as described in Example I. The results are indicated in Table 4.

Bleach composition D has a density range of 0.35–0.42 grams/cc. and it had particle size distribution as follows:

| Held on USS mesh #: | Percent |
|---|---|
| 10 | 0 |
| 14 | .67 |
| 18 | 9.33 |
| 25 | 29.33 |
| 35 | 32.00 |
| 45 | 16.67 |
| 60 | 7.33 |
| 80 | 3.33 |
| 120 | .67 |
| Through 120 | .67 |

TABLE 4

| Cup quantity from— | Bleach Composition C (percent average Cl₂) | | Bleach Composition D (percent average Cl₂) | | Bleach Composition E (percent average Cl₂) | |
|---|---|---|---|---|---|---|
| | Not vibrated | Vibrated | Not vibrated | Vibrated | Not vibrated | Vibrated |
| Top of carton | 10.40 | 9.84 | 11.08 | 10.27 | 9.79 | 10.19 |
| Center of carton | 10.76 | 10.33 | 10.53 | 12.05 | 12.14 | 9.06 |
| Bottom of carton | 9.49 | 11.20 | 12.35 | 11.53 | 9.11 | 10.94 |
| Mean average Cl₂ value | 10.22 | 10.46 | 11.32 | 11.28 | 10.35 | 10.06 |
| (Theoretical average Cl₂ value) | 10.80 | 10.80 | 10.80 | 10.80 | 10.80 | 10.80 |
| Percent deviation from mean value: | | | | | | |
| Top of carton | +1.76 | −5.92 | −2.12 | −8.95 | −5.41 | +1.29 |
| Center of carton | +5.28 | −1.24 | −6.97 | +6.82 | +17.29 | −9.94 |
| Bottom of carton | −7.14 | +7.06 | +9.09 | +2.21 | −11.98 | +8.74 |
| Standard deviation | 0.654 | 0.689 | 0.933 | 0.915 | 1.59 | 0.946 |
| Co-efficient of variation | 6.4 | 6.6 | 8.2 | 8.1 | 15.4 | 9.4 |

The superiority of the process of the present invention is also demonstrated in this example.

EXAMPLE III

A spray-dried base was also formed from the components and conditions indicated in Table 5.

TABLE 5

Components: Parts by weight
- Sodium tripolyphosphate _____ 20.00
- Sodium toluene sulfonate (active basis) ____ 25.00
- $Na_2B_4O_7 \cdot 5H_2O$ _____ 20.00
- Calcofluor White 5B _____ 0.115
- Tinopal RBS _____ 0.104
- Ultramarine Blue _____ 0.50
- Sodium sulfate _____ 9.991
- Water _____ 4.00

Conditions:
- Slurry temperature (° F.) _____ 160
- Pressure (p.s.i.g.) _____ 100–150
- Air inlet temperature (° F.) _____ 625
- Air outlet temperature (° F.) _____ 250–280
- Density¹ (g./cc.) _____ 0.25–0.35
- Water content¹ (percent) _____ 6–10

¹ Samples taken at various intervals during spray drying.

After screening through a 10 mesh screen, the spray-dried base had a moisture content of 11.3% and a density of 0.423 g./cc.

Sixty-seven parts of spray-dried base were blended with 18 parts of potassium dichlorocyanurate by introducing the two components into a rotating horizontal drum. A 60% aqueous solution was sprayed into the rotating blend (1 lb. per minute at room temperature) to add 9 parts of tetrapotassium pyrophosphate. Low density bleach composition F was formed after aging by air blowing at 100°–150° F. for 15 minutes.

The co-efficient of variation was then calculated in the same manner as set forth in Example I. Table 6 indicates the results.

TABLE 6

| | Bleach Composition F (Percent average Cl₂) | |
|---|---|---|
| Cup quantity from— | Not vibrated | Vibrated |
| Top of carton | 10.1 | 9.1 |
| Center of carton | 8.4 | 9.7 |
| Bottom of carton | 9.3 | 9.2 |
| Mean average Cl₂ value | 9.3 | 9.3 |
| (Theoretical average Cl₂ value) | 10.8 | 10.8 |
| Percent Deviation from Mean Value: | | |
| Top of carton | +8.6 | −2.1 |
| Center of carton | −9.7 | +4.3 |
| Bottom of carton | 0.0 | −1.1 |
| Standard deviation | 0.85 | 0.32 |
| Co-efficient of variation | 9.2 | 3.4 |

The density range for bleach composition F was 0.40–0.46 gram/cc. and the particle size distribution was as follows:

| Held on USS mesh #: | Percent |
|---|---|
| 10 | 0 |
| 14 | 0.5 |
| 18 | 3.0 |
| 25 | 18.0 |
| 35 | 43.5 |
| 45 | 25.0 |
| 60 | 6.5 |
| 80 | 2.5 |
| 120 | 0.5 |
| Through 120 | 0.5 |

A suitable low density bleach composition is provided in this example.

EXAMPLE IV

A spray-dried base was prepared from the components and conditions described in Example I except that ultramarine blue was not included therein. The spray-dried base (402 grams) was placed in a Hobart Kitchen Aid Mixer with 108 grams of potassium dichlorocyanurate. This was mixed with 57 grams of a 15% aqueous solution of sodium tripolyphosphate (8.55 grams solids) sprayed from an atomizer. The product was tumbled for about ½ hour at ambient temperature in a Twin-Shell Blender to condition the particles. The following values for the resulting bleach composition G were noted:

Theoretical available chlorine value (percent) ___ 11.4
Initial available chlorine value (percent) _____ 11.9

Bleach composition G was subsequently stored in closed 8 ounce jars either at room temperature or at 105° F. The available chlorine values were determined after the following storage:

| Time | Temperature | Average Cl₂ value (percent) |
|---|---|---|
| 1 day | Room temperature | 11.97 |
| 6 days | do | 11.49 |
| Do | 105° F | 11.58 |
| 13 days | Room temperature | 11.56 |
| Do | 105° F | 11.46 |
| 4 weeks | Room temperature | 11.45 |
| Do | 105° F | 11.27 |
| 2 months | Room temperature | 11.80 |
| Do | 105° F | 11.13 |

It is also possible in the invention to add the aqueous solution of tetrapotassium pyrophosphate or sodium tripolyphosphate to the spray dried base and then add the chlorinating agent. The aqueous solution, moreover, can be initially sprayed on the chlorinating agent prior to blending with the spray-dried base.

The following examples are submitted to illustrate but not to limit this invention. Unless otherwise indicated, all parts and percentages of the specification and claims are based upon weight.

EXAMPLE I

A spray-dried base was formed from the components and at the conditions indicated in Table I.

TABLE 1

| Components: | Parts |
|---|---|
| Sodium tripolyphosphate | 20.00 |
| Sodium toluene sulfonate (active basis) | 25.00 |
| $Na_2B_4O_7 \cdot 5H_2O$ | 20.00 |
| Calcofluor White 5B | 0.115 |
| Tinopal RBS | 0.104 |
| Ultramarine Blue | 0.50 |
| Sodium sulfate | 9.991 |
| Water | 4.00 |
| Conditions: | |
| Slurry temperature (° F.) | 160 |
| Pressure (p.s.i.g.) | 80–120 |
| Air inlet temperature (° F.) | 625–675 |
| Air outlet temperature (° F.) | 250–300 |
| Density [1] (g./cc.) | 0.255–0.34 |
| Water content [1] (percent) | 8.5–15 |

[1] Samples taken at various intervals during spray drying.

After screening through a 10 mesh screen, the spray-dried base had a moisture content of 10% and a density of 0.285 g./cc.

The spray-dried base (67 parts) was blended with potassium dichlorocyanurate (18 parts) by introducing the two components into a rotating horizontal drum. A 60% aqueous solution of tetrapotassium pyrophosphate was sprayed into the rotating blend (1 lb. per minute at room temperature) until 9 parts of tetrapotassium pyrophosphate solids were added. The resulting product was then aged by air blowing at 100°–150° F. for 15 minutes to form low density bleach composition A.

Bleach composition B was provided by the same procedure except that no tetrapotassium pyrophosphate solution was added to the blend.

The uniformity was determined by packaging bleach composition A in boxes about 6" x 2⅛" x 8½". Bleach composition B was packaged similarly. Some of the boxes of each composition were vibrated for 5 minutes on the pan of a Syntron Jogger, Model J–1A. The available chlorine values of standard cupfuls from both unvibrated and vibrated boxes were determined. The co-efficient of variation was then calculated as listed in Table 2.

The density range for bleach composition A was 0.38–0.45 gram/cc. and the particle size distribution was as follows:

| Held on USS mesh #: | Percent |
|---|---|
| 10 | 0 |
| 14 | 0.5 |
| 18 | 11.5 |
| 25 | 39.0 |
| 35 | 29.0 |
| 45 | 10.5 |
| 60 | 4.5 |
| 80 | 3.0 |
| 120 | 1.5 |
| Through 120 | 0.5 |

This example demonstrates the superiority of the process of this invention.

EXAMPLE II

The components and the conditions listed in Table 3 were used to provide a spray-dried base.

TABLE 3

| Components: | Pounds |
|---|---|
| Sodium tripolyphosphate | 200 |
| Sodium toluene sulfonate (active basis) | 250 |
| $Na_2B_4O_7 \cdot 5H_2O$ | 200 |
| Calcofluor White 5 B | 1.0 |
| Tinopal RBS | 0.9 |
| Sodium sulfate | 105 |
| Water | [1] 36.2 |
| Conditions: | |
| Slurry temperature (° F.) | 160 |
| Pressure (p.s.i.g.) | 100–200 |
| Air inlet temperature (° F.) | 625 |
| Air outlet temperature (° F.) | 225 |
| Density [2] (g./cc.) | 0.22–0.30 |
| Water content [2] (percent) | 7–9 |

[1] Gallons.
[2] Samples taken at various intervals during spray drying.

The spray-dried base after screening through a 10 mesh screen had a moisture content of 8% and a density of 0.313 g./cc.

A blend was formed by introducing into a rotating horizontal drum 62 parts of the spray-dried base and 18 parts of potassium dichlorocyanurate. Twelve parts of tetrapotassium pyrophosphate solids were added by spraying a 60% aqueous solution into the rotating blend (1 lb. per minute at room temperature). After aging subsequently by air blowing at 100°–150° F. for 15 minutes, low density bleach composition C was formed.

Bleach composition D was similarly provided except that 3 parts of tetrapotassium pyrophosphate solids were added to the blend.

Bleach composition E was formed by the same procedure except that no tetrapotassium pyrophosphate solution was added to the blend.

TABLE 2

| Cup quantity from— | Bleach Composition A (percent average $Cl_2$) | | Bleach Composition B (percent average $Cl_2$) | |
|---|---|---|---|---|
| | Not vibrated | Vibrated | Not vibrated | Vibrated |
| Top of carton | 10.09 | 10.11 | 9.67 | 8.48 |
| Center of carton | 10.87 | 10.35 | 17.44 | 11.24 |
| Bottom of carton | 11.21 | 10.91 | 16.29 | 10.93 |
| Mean average $Cl_2$ value | 10.72 | 10.46 | 14.48 | 10.20 |
| (Theoretical average $Cl_2$ value) | 10.80 | 10.80 | 10.80 | 10.86 |
| Percent deviation from mean value: | | | | |
| Top of carton | −5.9 | −3.3 | −33.2 | −15.6 |
| Center of carton | +2.7 | −1.0 | +20.4 | +10.3 |
| Bottom of carton | +4.6 | +4.3 | +12.5 | +6.9 |
| Standard deviation | .58 | .41 | 4.19 | 1.54 |
| Co-efficient of variation | 5.4 | 3.9 | 29.0 | 15.1 |

This example shows that a suitable stable product is obtained.

EXAMPLE V

Suitable bleach compositions can be provided from the following components using the procedure of Example I:

| | Bleach Composition (parts) | | | |
|---|---|---|---|---|
| | H | I | J | K |
| Spray-dried base: | | | | |
| Sodium tripolyphosphate | 16.4 | 8.2 | | |
| Tetrasodium pyrophosphate | | 8.2 | | |
| Sodium trimetaphosphate | | | 18.0 | |
| Sodium tetraphosphate | | | | 17.0 |
| Borax pentahydrate | 16.3 | 16.3 | 18.0 | 16.0 |
| Sodium toluene sulfonate (solids) | 20.4 | 20.4 | 21.0 | 20.2 |
| Sodium sulfate | 11.12 | 3.72 | 6.50 | 7.54 |
| Fluorescent dyes of Example I | 0.12 | 0.12 | 0.12 | 0.12 |
| Water | 3.4 | 7.2 | 4.2 | 3.3 |
| Chlorinating agents | | | | |
| Sodium dichlorocyanurate | | 19.0 | | 19.0 |
| [(Monotrichloro)-tetra-(monopotassium dichloro)] pentaisocyanurate | 16.4 | | 16.4 | |
| Cementing solution: | | | | |
| Tetrapotassium pyrophosphate | 8.4 | 9.0 | 8.4 | 9.0 |
| Water | 5.6 | 6.0 | 5.6 | 6.0 |

EXAMPLE VI

The spray dried base (73 parts) of Example III was sprayed with a 60% tetrapotassium pyrophosphate solution (9 parts). Potassium dichlorocyanurate (18 parts) was then mixed with the wetted base. Bleach composition L was formed by following the conditions set forth in Example III. The co-efficient of variation for bleach composition L non-vibrated was 8.8.

EXAMPLE VII

Ten parts of a 60% tetrapotassium pyrophosphate solution was sprayed onto 18 parts of potassium dichlorocyanurate. The sprayed material was mixed into the spray-dried base (72 parts) of the type described in Example III. After following the conditions of Example III, the coefficient of variation of resulting bleach composition M vibrated was 9.0.

Examples VI and VII demonstrate that products having a low co-efficient of variation are also obtained by adding the tetrapotassium pyrophosphate to the spray-dried base before the chlorinating agent is added or by initially spraying the tetrapotassium pyrophosphate to the chlorinating agent.

Having set forth the general nature and specific embodiments of the present invention, the true scope is now particularly pointed out in the appended claims.

What is claimed is:

1. A process for providing a light density bleach composition with a chlorinating agent distributed uniformly throughout a spray-dried base which comprises forming a spray-dried base consisting essentially of about 10 to 30 parts inorganic phosphate builder, about 5 to 30 parts hydrated borax which promotes a light density product and about 5 to 35 parts solubilizing agent for the hydrated borax and adding to about 100 parts of the spray-dried base about 6 to 42 parts of a chlorine-releasing organic compound which is compatible with the spray-dried base and an aqueous solution of tetrapotassium pyrophosphate or sodium tripolyphosphate or mixtures thereof in an amount effective to cement the chlorinating agent to the spray-dried base.

2. The process according to claim 1 in which the phosphate builder is sodium tripolyphosphate, potassium tripolyphosphate, tetrasodium pyrophosphate, tetrapotassium pyrophosphate, sodium acid pyrophosphate, sodium trimetaphosphate or sodium hexametaphosphate.

3. The process according to claim 1 in which the hydrated borax is borax pentahydrate or borax decahydrate.

4. The process according to claim 1 in which the solubilizing agent is sodium toluene sulfonate or sodium xylene sulfonate.

5. The process according to claim 1 in which the chlorinating agent is potassium dichlorocyanurate, sodium dichlorocyanurate, [(mono-trichloro)-tetra-(mono potassium dichloro)] penta-isocyanurate, 1,3-dichloro-5,5-dimethyl hydantoin, N,N' - dichlorobenzoyleneurea, para-toluene sulfondichloroamide, trichloromelamine, N-chloroammeline, N-chloro succinimide, N,N'-dichloroazodicarbonamidine, N-chloro acetyl urea, N,N'-dichlorobiuret, chlorinated dicyandiamide, chlorinated trisodium phosphate or the sodium derivative of N-chloro-p-toluenesulfonamide.

6. A process for providing a bleach composition which comprises forming a spray-dried base consisting essentially of about 10 to 30 parts inorganic phosphate builder, about 5 to 30 parts hydrated borax which promotes a light density product, and about 5 to 35 parts solubilizing agent for the hydrated borax; blending about 100 parts of the spray-dried base with about 6 to 42 parts of a chlorine-releasing organic compound which is compatible with the spray-dried base; adding to the blend tetrapotassium pyrophosphate or sodium tripolyphosphate as an aqueous solution; and aging at a temperature below 175° F. to provide without any breaking down and screening steps a product having a bulk density less than about 0.60 g./cc., a majority of the particles having a size ranging from about 25 to 45 mesh and a co-efficient of available chlorine variation of not more than about 10.

7. The product prepared by the process of claim 1.

8. The product prepared by the process of claim 6.

References Cited
UNITED STATES PATENTS

| 3,093,590 | 6/1963 | Ferris | 202—99 |
| 3,112,274 | 11/1963 | Morgenthaler et al. | 202—99 |
| 3,166,513 | 1/1965 | Mizuno et al. | 202—99 |
| 3,257,324 | 6/1966 | Wearn et al. | 202—99 |

MAYER WEINBLATT, Primary Examiner

U.S. Cl. X.R.

252—187